United States Patent Office 2,995,554
Patented Aug. 8, 1961

2,995,554
SUBSTITUTED GLYCOLIC ACID ESTERS OF 1,4-BIS-(HYDROXYALKYL)-PIPERAZINES
John H. Biel, Milwaukee, Wis., assignor, by mesne assignments, to Lakeside Laboratories, Inc., Milwaukee, Wis., a corporation of Delaware
No Drawing. Filed Oct. 24, 1958, Ser. No. 769,291
10 Claims. (Cl. 260—268)

This invention relates to piperazine derivatives. More particularly, this invention is concerned with novel ester derivatives of 1,4-bis-(hydroxyalkyl) piperazines and the use of such compounds as psychotherapeutics.

This application is a continuation-in-part of my copending application Serial No. 712,340, filed January 31, 1958, now abandoned.

The term "bis" as used herein is intended to include both symmetrical and unsymmetrical groups of the same class. Thus, 1 - (beta - hydroxyethyl - 4 - (beta - hydroxypropyl)-piperazine is considered a 1,4-bis-(hydroxyalkyl)piperazine.

According to the present invention there are provided novel compounds of the formula

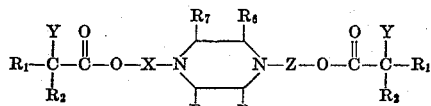

FORMULA I wherein $R_1$ is phenyl, 2-thienyl, cyclohexyl, chlorophenyl, methylphenyl or methoxyphenyl, $R_2$ is phenyl, cyclohexyl, 2-thienyl or cyclopentyl, $R_4$, $R_5$, $R_6$ and $R_7$ are hydrogen or lower alkyl groups, and particularly methyl, Y is hydroxy, a halogen such as chlorine, bromine or iodine, or an acyloxy group such as derived from lower carboxylic acids such as acetic acid and propionic acid, and X and Z are straight or branched lower alkylene groups having at least 2 carbons betwen the nitrogen and the ester group, and advisably having not more than a total of 5 carbons in the chain, as well as acid addition salts thereof.

Those compounds of Formula I in which Y is hydroxy may be conveniently prepared by an ester interchange reaction in which an ester of a dicyclic glycolic acid is reacted with a 1,4-bis-(hydroxyalkyl) piperazine in an inert organic solvent in the presence of an alkaline catalyst such as sodium or sodium methoxide. This reaction may be represented as follows:

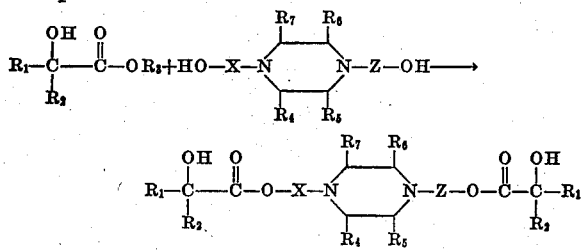

wherein X, Z, $R_1$, $R_2$, $R_4$, $R_5$, $R_6$ and $R_7$ have the significance previously assigned, and $R_3$ is a hydrocarbon group, and advisably a lower alkyl group.

Representative dicyclic glycolic acids which may be used in this process in the form of suitable esters are benzilic acid, phenylcyclohexyl glycolic acid, phenylcyclopentyl glycolic acid, 2-thienyl phenyl glycolic acid, dicyclohexyl glycolic acid, methylphenyl-phenyl glycolic acid and the like. Generally, such compounds are used in the process in the form of esters of lower alcohols such as methanol, ethanol, propanol and so forth.

In addition to 1,4-bis-(hydroxyethyl)-piperazine, other related compounds such as 1,4-bis-(2'-hydroxy-2'-methyl ethyl)-piperazine,
1,4-bis-(hydroxyethyl)-2-methyl piperazine,
1-(beta-hydroxyethyl)-4-(beta-hydroxypropyl)-piperazine,
1,4-bis-(beta-hydroxyethyl)-cis-2,5-dimethyl piperazine,
1,4-bis-(beta-hydroxyethyl)-2-methylpiperazine,
1,4-bis-(beta-hydroxypropyl)-2,3,5,6-tetramethyl piperazine, and
1,4-bis-(2'-hydroxy-2'-methyl ethyl)-2-methyl piperazine may be used in the process.

Suitable solvents for use in carrying out the reaction are n-heptane, methylcyclohexane and xylene. Elevated temperatures such as the reflux temperature are generally used. By removing the alcohol by-product formed in the reaction, it is induced to go to completion within a minimum of time. After the theoretical amount of alcohol is collected the reaction is considered completed. The desired product may be conveniently recovered from the mixture by conventional means such as by fractional distillation.

Representative of the compounds which are produced by this process are 1,4-bis-(phenylcyclopentyl glycoloxy ethyl)-piperazine, 1,4-bis-benziloxyethyl piperazine, 1,4-bis-(2'-methyl-2'-benziloxyethyl) - 2 - methyl-piperazine, 1,4-bis-(phenylcyclohexyl glycoloxy ethyl) - piperazine, 1,4-bis-(phenyl-2-thienyl glycoloxy ethyl)-piperazine, 1,4-bis-(2'-methyl-2'-benziloxyethyl)-piperazine, 1,4 - bis-(dicyclohexyl glycoloxy ethyl)-piperazine, 1,4-bis-(di-2-thienyl glycoloxy ethyl)-piperazine, 1,4-bis-(cyclopentyl-cyclohexyl glycoloxy ethyl)-piperazine, 1,4-bis-(methylphenyl phenyl glycoloxy ethyl)-piperazine, 1-(beta-benziloxyethyl)-4-(beta-benziloxypropyl)-piperazine, 1,4-bis-(beta-benziloxyethyl)-2,5-cis-dimethyl piperazine, 1,4-bis-(beta-benziloxyethyl)-2-methyl piperazine, and 1,4-bis-(beta phenylcyclopentylglycoloxyethyl)-2,3,5,6-tetramethyl-piperazine and the like.

These and other compounds within the scope and contemplation of the invention may also be produced by an alternative process in which an appropriate dicyclic-alpha-halo or acyloxy-acetylhalide is reacted with a 1,4-bis-(hydroxyalkyl)-piperazine to form a 1,4-bis-(dicyclic-alpha-halo or acyloxy-acetoxy ethyl)-piperazine which is readily hydrolyzed to the 1,4-bis-(dicyclic glycoloxy alkyl)-piperazine. This process may be illustrated as follows:

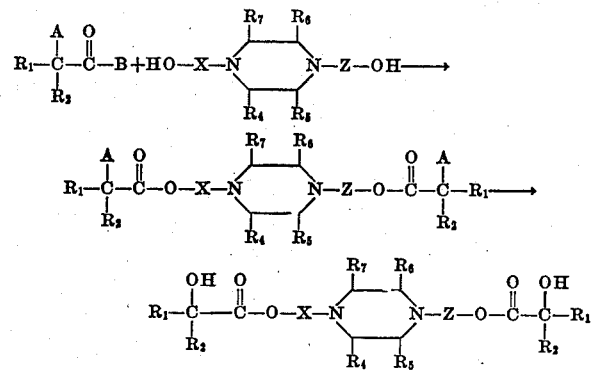

wherein X, Z, $R_1$, $R_2$, $R_4$, $R_5$, $R_6$ and $R_7$ have the significance previously assigned, A is a halogen or an acyloxy group, and B is a reactive halogen, advisably bromine or chlorine. A is advisably bromine or chlorine or acyloxy groups from lower carboxylic acids such as acetic acid and propionic acid and derivatives thereof such as benzoic acid and phenylacetic acid.

Some of the dicyclic-alpha-halo or acyloxy acetyl halides which may be employed in this process are diphenylchloroacetyl chloride, phenylcyclohexylchloroacetyl bromide, dicyclohexylchloroacetyl chloride, cyclopentylcyclohexyl bromoacetyl bromide, phenyl 2-thienyl chloroacetyl chloride, chlorophenylcyclohexylacetyloxy acetyl chloride, and diphenyl phenylacetyloxy acetyl chloride.

The 1,4 - bis - (hydroxyalkyl) - piperazines previously named may be used in this process.

In the first step of this alternative process the reactants are conveniently brought together in an inert organic solvent such as toluene, isopropanol, and acetone. An acid acceptor such as triethylamine is generally included in the reaction mixture to remove the hydrohalic acid formed in the reaction. Elevated temperatures up to the reflux temperature are generally employed to enhance the rate of reaction and maintain solubility of the amino alcohol. Following reaction, the mixture may be worked up according to conventional methods to recover the desired 1,4-bis-(dicyclic alpha-halo or acyloxyacetoxyalkyl)-piperazine.

Some of the compounds which are produced according to this process are 1,4-bis-(diphenylchloroacetoxyethyl)-piperazine, 1,4 - bis-(phenylcyclohexylchloroacetoxypropyl)-piperazine, 1,4-bis-(phenyl-2-thienyl chloroacetoxybutyl)-piperazine, 1,4-bis-(dicyclohexylbromoacetoxyethyl)-piperazine, 1,4 - bis - (2' - diphenylbromoacetoxy-2'-methyl-ethyl)-piperazine, 1,4-bis-[2'-(alpha,alpha-diphenyl-alpha-acetoxy acetoxy)-2'-(methyl)-ethyl] - piperazine and the like.

Hydrolysis of the 1,4-bis-(dicyclic alpha-halo or acyloxy-acetoxy alkyl)-piperazines to the corresponding 1,4-bis - (dicyclic glycoloxy alkyl) - piperazines is readily achieved with aqueous acid such as an aqueous mineral acid.

Acid addition salts of all the novel compounds within the scope of this invention are produced by contacting the tertiary base with a suitable acid such as a mineral acid, for example, sulfuric acid or hydrochloric acid, or an organic acid such as maleic acid, fumaric acid, acetic acid or citric acid. The acid addition salts of the compounds of Formula I in which Y is a halogen or acyloxy group are formed in the absence of water to avoid hydrolysis of these groups to the hydroxy group.

These compounds, advisably in the form of nontoxic acid addition salts, exert a pronounced psychotherapeutic effect when administered to animals and humans. The compounds antagonize the psychotogenic effects produced by N-alkyl-3-piperidyl benzilates. Some of these psychotogenic effects are the inducement of hallucinations, both auditory and visual, and the creation of a schizophrenic state in humans. See applicant's copending application, Serial No. 704,247, filed December 23, 1957. The 1,4-bis-(benziloxyethyl)-piperazine dihydrochloride is several times more potent and long-acting than 4-methyl-piperazinoethyl benzilate dihydrochloride (see applicant's copending application Serial No. 704,246, filed December 23, 1957, now abandoned for data on this compound) in hallucinating and belligerent patients. Patients who were hallucinating and out of contact with reality lost their hallucinations and again became communicative with their environment after receiving 1,4-bis-(benziloxyethyl)-piperazine dihydrochloride. They also experienced a feeling of relaxation without hypnosis and a relief from anxiety and restlessness. The compound is devoid of disagreeable anticholinergic effects such as dry mouth, mydriasis and drowsiness.

The compounds of Formula I in which Y is a halogen or acyloxy group hydrolyze when administered to animals and the groups represented by Y are converted to hydroxy groups.

The compounds of this invention are generally formulated into suitable pharmaceutical forms for administration to animals and humans. The preferred route of administration is oral and for this method tablets and capsules are ordinarily recommended. Unit-dosages may contain from about 2.5 to 30 mgm. or more and may be administered once or more a day or at other suitable intervals according to the condition of the patient.

Any suitable pharmaceutical carriers may be used with one or more of the active compounds to achieve a more practical volume for a unit-dosage. Sugar, starch and talc are suitable solid carriers which may be used in forming tablets and capsules. However, liquid carriers such as water may also be used as desired. One typical tablet may have the following composition:

(1) 1,4-bis-(benziloxyethyl)-piperazine  Mg.
    dihydrochloride _____ 5
(2) Starch U.S.P_____ 57
(3) Lactose U.S.P_____ 73
(4) Talc U.S.P_____ 9
(2) Stearic acid_____ 6

Powders 1, 2 and 3 are slugged, then granulated, mixed with 4 and 5, and tableted.

The following examples illustrate the preparation of specific compounds within the scope of this invention:

Example 1

1,4-BIS-(BETA-BENZILOXYETHYL)-PIPERAZINE AND DIHYDROCHLORIDE THEREOF

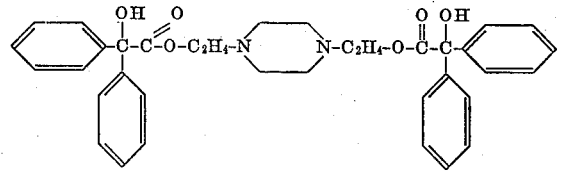

A mixture containing 69.6 g. (0.40 mole) of 1,4-di-(beta-hydroxyethyl)-piperazine, 48.4 g. (0.20 mole) of methyl benzilate, 0.8 g. of sodium methoxide and 500 cc. of n-heptane was refluxed with stirring for three hours, the methanol being collected in a Dean-Stark water separator. Two-thirds of the n-heptane was removed by distillation at the completion of the reaction and the solid residue removed by filtration. The precipitate was washed successively with acetone and water; yield 56 g. (94%), M.P. 159–161° C.

*Analysis.*—Calcd. for $C_{36}H_{38}N_2O_6$ N, 4.71. Found: N, 4.83.

The di-hydrochloride salt was prepared from 15.4 g. (0.026 mole) of the base suspended in 150 cc. of methanol and treated with 30 cc. of 2.6 N ethereal hydrochloric acid. The solid was isolated by filtration and washed with methanol; yield 15.4 g. (89%), M.P. 229° C. dec.

*Analysis.*—Calcd. for $C_{36}H_{40}Cl_2N_2O_6$: Cl, 10.62; N, 4.19. Found: Cl, 10.46; N, 4.14.

Example 2

1,4-BIS-(BETA - PHENYLCYCLOHEXYLGLYCOLOXYETHYL)-PIPERAZINE AND DIHYDROCHLORIDE THEREOF

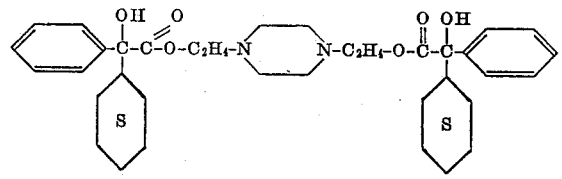

From 24.8 g. (0.1 M) of methyl phenylcyclohexylglycolate and 34.8 g. (0.2 M) of 1,4-dihydroxyethyl piperazine reacted as in Example 1 there was obtained 31.3 g. of the ester as an orange oil.

The basic ester was converted to its dihydrochloride salt in ether with ethereal hydrochloric acid; 27 g. of crude salt was collected by filtration, M.P. 210–215° C. The crude salt was suspended in 250 cc. of hot isopropyl alcohol, cooled to room temperature and filtered; yield 19 g., M.P. 227–229° C. dec.

*Analysis.*—Calcd. for $C_{36}H_{52}Cl_2N_2O_6$: Cl, 10.43; N, 4.12. Found: Cl, 10.68; N, 4.08.

Example 3

1,4-BIS-(BETA-PHENYLCYCLOPENTYLGLYCOLOXY-ETHYL)-PIPERAZINE

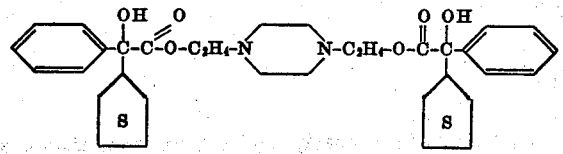

From 35.0 g. (0.15 mole) of methyl phenylcyclopentyl glycolate and 13.05 g. (0.075 mole) of 1,4-bis-hydroxyethyl piperazine reacted as in Example 1, there was obtained 13.9 g. of the solid basic ester; M.P. 126–127° C.

Example 4

1,4-BIS-(2'-METHYL-2'-BENZILOXYETHYL)2-METHYL-PIPERAZINE AND DIHYDROCHLORIDE THEREOF

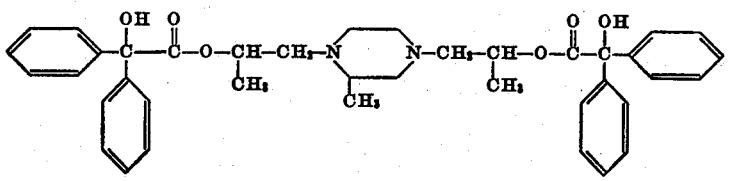

From 43.2 g. (0.20 mole) of 1,4-bis-(beta-hydroxypropyl)-2-methyl piperazine and 48.4 g. (0.20 mole) of methyl benzilate reacted as in Example 1, there was obtained the basic ester as a water insoluble oil. The oil was dissolved in anhydrous ether and converted to the dihydrochloride salt with ethereal hydrochloric acid; M.P. 131–133° C.

Example 5

1,4-BIS-(BETA-DIPHENYLCHLOROACETOXYETHYL)-PIPERAZINE AND DIHYDROCHLORIDE THEREOF

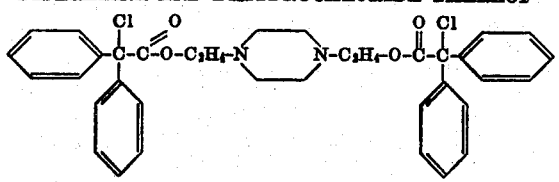

To 53 g. (0.20 mole) of diphenylchloroacetyl chloride in 100 cc. of dry toluene was added a hot solution of 17 g. (0.10 mole) of 1,4-bis-hydroxyethylpiperazine, 22.2 g. (0.22 mole) of triethylamine and 300 cc. of toluene. The reaction mixture was kept just below reflux temperature to prevent crystallization of the sparingly soluble piperazinoalcohol. After completion of the addition, stirring and refluxing were continued for another two hours. The mixture was then filtered hot to remove the triethylamine hydrochloride which precipitated during the reaction. The filtrate was concentrated and the basic ester obtained as a water insoluble residue.

The basic ester was converted to the dihydrochloride salt in acetone with ethereal hydrochloric acid; yield 73 g. (100%), M.P. 234–235° C. dec.

*Analysis.*—Calcd. for $C_{36}H_{38}Cl_4N_2O_4$: N, 3.97; Cl, 20.17. Found: N, 4.09; Cl, 19.47.

Example 6

1-(BETA-BENZILOXYETHYL)-4-(BETA-BENZILOXY-PROPYL)-PIPERAZINE DIHYDROCHLORIDE

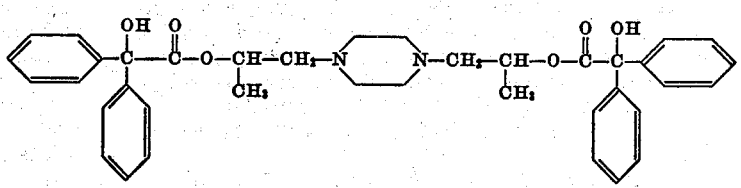

A mixture consisting of 18.8 g. (0.10 mole) of 1-(beta-hydroxyethyl)-4-(beta hydroxypropyl)-piperazine, 48.4 g. (0.20 mole) of methylbenzilate, 0.7 g. of sodium methoxide and 250 cc. of n-heptane was refluxed until 12 cc. of methanol was collected. The catalyst was removed by filtration. The filtrate was washed with 100 cc. of water, dried over potassium carbonate and concentrated to dryness in vacuo. The residue weighed 60 g. (99%). It was dissolved in 500 cc. of methanol and acidified to pH 3 with ethereal hydrochloric acid. The solid was collected by filtration; yield 39 g. (58%), M.P. 227° C. dec.

*Anal.*—Calcd. for $C_{37}H_{42}Cl_2N_2O_6$: N, 4.11; Cl, 10.40. Found: N, 3.98; Cl, 10.47.

Example 7

1,4-BIS-(BETA-BENZILOXYETHYL)-2,5-CIS-DIMETHYL PIPERAZINE DIHYDROCHLORIDE

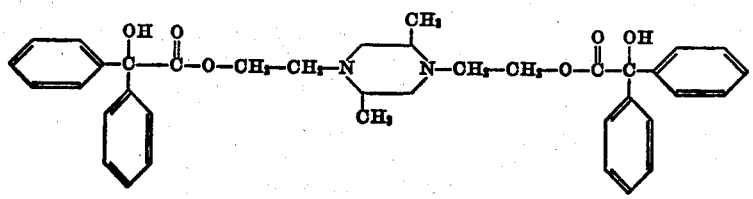

A mixture consisting of 20.2 g. (0.10 mole) of 1,4-bis-(beta-hydroxyethyl)-2,5-cis-dimethyl piperazine, 48.4 g. (0.20 mole) of methylbenzilate, 0.4 g. of sodium methoxide and 250 cc. of n-heptane was refluxed until 12 cc. of methanol was collected. The catalyst was removed by filtration. The filtrate wash washed with 100 cc. water, dried over potassium carbonate, and concentrated to dryness in vacuo. The residue weighed 62 g. (100%). It was dissolved in 500 cc. of acetone and acidified to pH 3 with ethereal hydrochloric acid. The solid was collected by filtration; yield 55.2 g. (79.5%), M.P. 217–218° C. dec.

*Anal.*—Calcd. for $C_{38}H_{44}Cl_2N_2O_6$: N, 4.02; Cl, 10.19. Found: N, 4.19; Cl, 10.59.

Example 8

1,4-BIS-(BETA-BENZILOXYETHYL)-2-METHYL PIPERAZINE DIHYDROCHLORIDE

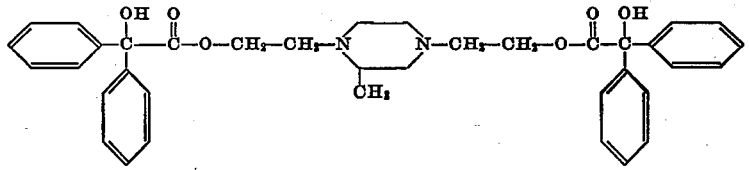

A mixture consisting of 18.8 g. (0.10 mole) of 1,4-bis-(beta-hydroxyethyl)-2-methyl piperazine, 48.4 g. (0.20 mole) of methylbenzilate, 0.5 g. of sodium methoxide and 250 cc. of n-heptane was refluxed and the methanol reaction product was collected. The catalyst was removed by filtration. The filtrate was washed with 200 cc. of water, dried over potassium carbonate, and concentrated to dryness in vacuo. The residue was washed with acetone; yield 46 g. (76%), M.P. 139–140° C. dec.

Anal.—Calcd. for $C_{37}H_{40}N_2O_6$: N, 4.60. Found: N, 4.55.

A suspension of 20.3 g. (0.033 mole) of free base in 450 cc. of methanol was acidified to pH 3 with ethereal hydrochloric acid. The solid was collected by filtration; yield 20.6 g. (92%), M.P. 228–229° C. dec.

Anal.—Calcd. for $C_{37}H_{42}Cl_2N_2O_6$: N, 4.11; Cl, 10.40. Found: N, 4.15; Cl, 10.39.

Example 9

1,4-BIS-(BETA-PHENYLCYCLOPENTYLGLYCOLOXY-ETHYL)-PIPERAZINE DIHYDROCHLORIDE

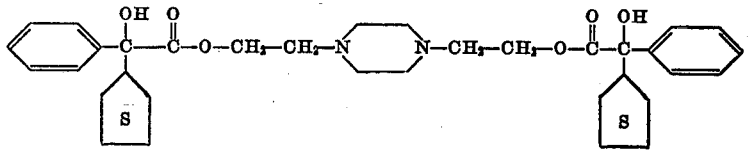

A mixture consisting of 35 g. (0.15 mole) of methylphenylcyclopentylglycolate, 13.05 g. (0.075 mole) of 1,4-bis-(beta-hydroxyethyl)-piperazine, 0.8 g. of sodium methoxide and 400 cc. of n-heptane was refluxed until 8.5 cc. of methanol was collected. The catalyst was removed by filtration. The filtrate was washed with 200 cc. of water, dried over potassium carbonate and concentrated to dryness in vacuo; yield 13.9 g. (32%), M.P. 126–127° C.

Anal.—Calcd. for $C_{34}H_{46}N_2O_6$: N, 4.84. Found: N, 4.83.

The base was dissolved in 150 cc. of methanol and the solution was acidified to pH 3 with ethereal hydrochloric acid. The solid was collected by filtration; yield 13.7 g. (88%), M.P. 219° C. dec.

Anal.—Calcd. for $C_{34}H_{48}Cl_2N_2O_6$: N, 4.30; Cl, 10.89. Found: N, 4.28; Cl, 10.70.

The known 1,4-bis-(hydroxyalkyl)-piperazines used as starting materials in this invention may be prepared according to prior art procedures or by the novel process of reacting piperazine or a 1,-hydroxyalkyl piperazine with a lower alkylene oxide. This reaction may be represented as follows:

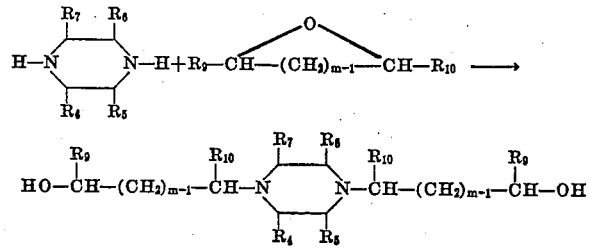

wherein $R_4$, $R_5$, $R_6$ and $R_7$ have the significance previously assigned, $R_9$ and $R_{10}$ are hydrogen or lower alkyl groups, m is a positive integer from 1 to 2 and the lower alkylene oxide advisably contains not more than a total of 5 carbons.

In addition to piperazine, nuclear substituted piperazines such as 2-methyl piperazine, 2,5-cis-dimethyl piperazine and 2,3,5,6-cis-tetraethyl piperazine may be used in the reaction.

Some of the lower alkylene oxides which may be used in the process are ethylene oxide, 1,3-propylene oxide, 1,2-propylene oxide, 2,3-butylene oxide and 1,3-butylene oxide.

The reaction is readily effected by combining the reactants in a suitable organic solvent such as a lower alcohol, and particularly methanol. The reaction is advisably effected employing about one mole of piperazine reactant and two moles of lower alkylene oxide. The reaction proceeds at room temperature although the mixture may be heated slightly to enhance the reaction rate. After the reaction is terminated the product may be recovered by fractional distillation.

Representative of the 1,4-bis-(hydroxyalkyl)-piperazines which may be produced in this way are 1,4-bis-(beta-hydroxyethyl)-cis-2,5-dimethyl piperazine, 1,4-bis-(beta-hydroxypropyl)-piperazine and 1,4-bis-(gamma-hydroxybutyl)-piperazine.

Unsymmetrical 1,4-bis-(hydroxyalkyl)-piperazines are produced in a similar manner by reacting a 1-monosubstituted hydroxyalkyl-piperazine with a lower alkylene oxide according to the scheme

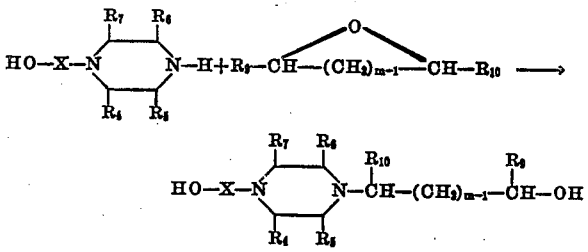

wherein X, m, $R_4$, $R_5$, $R_6$, $R_7$, $R_9$ and $R_{10}$ have the significance previously assigned.

This reaction may be readily effected with about equimolar quantities of reactants employing the conditions just described for producing the symmetrical 1,4-bis-(hydroxyalkyl)-piperazines.

The following examples illustrate these processes:

Example 10

1-(BETA-HYDROXYETHYL)-4-(BETA-HYDROXYPROPYL)-PIPERAZINE

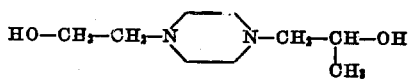

To a refluxing solution consisting of 65 g. (0.5 mole) of beta-hydroxyethyl piperazine and 250 cc. of methanol was added dropwise 29 g. (0.5 mole) of 1,2-propylene oxide. The solution was left standing at room temperature overnight. The solvent was distilled off in vacuo, and the product was collected by distillation, B.P. 116–118° C. (0.2 mm.), yield 87.6 g. (93%) $N_D^{25}$ 1.4970.

*Anal.*—Calcd. for $C_9H_{20}N_2O_2$: N, 14.88. Found: N, 15.21.

Example 11

1,4-BIS-(BETA-HYDROXYETHYL)-CIS-2,5-DIMETHYL-PIPERAZINE

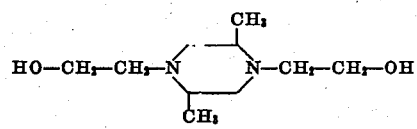

To a solution consisting of 50.2 g. (0.44 mole) of cis-2,5-dimethyl piperazine and 440 cc. of methanol was added dropwise 39 g. (0.88 mole) of ethylene oxide in 50 cc. of toluene. The solution temperature rose to 49° C. The solution stood overnight at room temperature. The solvent was distilled off in vacuo, and the product was collected by distillation, B.P. 138–140° C. (1.1 mm.), yield, 66.9 g. (75%), $N_D^{25}$ 1.5001.

*Anal.*—Calcd. for $C_{10}H_{22}N_2O_2$: N, 13.84. Found: N, 13.48.

Example 12

1,4-BIS-(BETA-HYDROXYETHYL)-2-METHYL-PIPERAZINE

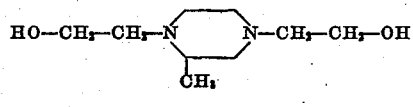

To a solution consisting of 75 g. (0.75 mole) of 2-methyl piperazine and 750 cc. of methanol was added dropwise 66 g. (1.5 moles) of ethylene oxide in 150 cc. of toluene. The solution temperature rose to 50° C. The solution was left standing at room temperature overnight. The solvent was distilled off in vacuo and the product was collected by distillation, B.P. 142–145° C. (0.4 mm.), yield 95.5 g. (67.7%), $N_D^{25}$ 1.5062.

*Anal.*—Calcd. for $C_9H_{20}N_2O_2$: N, 14.88. Found: N, 14.84.

Various changes and modifications of the invention can be made and, to the extent that such variations incorporate the spirit of this invention, they are intended to be included within the scope of the appended claims.

What is claimed is:
1. A member of the group consisting of compounds of the formula

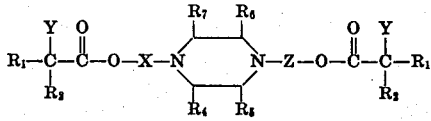

wherein $R_1$ is a member of the group consisting of phenyl, 2-thienyl, cyclohexyl, halophenyl, lower alkylphenyl and lower alkoxyphenyl groups, $R_2$ is a member of the group consisting of phenyl, cyclohexyl, 2-thienyl and cyclopentyl groups, X and Z are lower alkylene groups, $R_4$, $R_5$, $R_6$ and $R_7$ are members of the group consisting of hydrogen and lower alkyl groups, and Y is a member of the group consisting of hydroxy, halogen and groups represented by

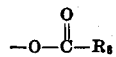

in which $R_8$ is a lower alkyl, and nontoxic acid addition salts thereof.

2. 1,4-bis-(beta-benziloxyethyl)-piperazine.
3. 1,4-bis-(beta-phenylcyclohexylglycoloxyethyl)-piperazine.
4. 1,4 - bis - (beta - phenylcyclopentylglycoloxyethyl)-piperazine.
5. 1,4-bis-(2'-methyl-2'-benziloxyethyl)-2-methylpiperazine.
6. 1,4 - bis - (beta-diphenylchloroacetoxyethyl)-piperazine.
7. 1-(beta-benziloxyethyl) - 4 - (beta-benziloxypropyl)-piperazine.
8. 1,4-bis-(beta-benziloxyethyl)-2,5-cis-dimethylpiperazine.
9. 1,4-bis-(beta-benziloxyethyl)-2-methyl-piperazine.
10. 1,4-bis-(beta - phenylcyclopentylglycoloxyethyl)-piperazine.

References Cited in the file of this patent

UNITED STATES PATENTS

| | | |
|---|---|---|
| 2,419,366 | Northey et al. | Apr. 22, 1947 |
| 2,541,260 | Malkemus et al. | Feb. 13, 1951 |
| 2,636,033 | Malkemus | Apr. 21, 1953 |

OTHER REFERENCES

Pyman: Jour. Chem. Soc., pp. 1802–1804 (1908).
Zaugg et al.: Jour. Amer. Chem. Soc., vol. 72, pages 3004–3007 (1950).

UNITED STATES PATENT OFFICE

CERTIFICATE OF CORRECTION

Patent No. 2,995,554                                                    August 8, 1961

John H. Biel

It is hereby certified that error appears in the above numbered patent requiring correction and that the said Letters Patent should read as corrected below.

Column 1, line 39, for "betwen" read -- between --; column 4, line 15, for "(2) Stearic acid" read -- (5) Stearic acid --; column 6, line 67, for "wash" read -- was --; column 7, line 63, for "1,-hydroxyalkyl" read -- 1-hydroxyalkyl --.

Signed and sealed this 26th day of December 1961.

(SEAL)
Attest:

ERNEST W. SWIDER                                         DAVID L. LADD
Attesting Officer                                             Commissioner of Patents

USCOMM-DC